United States Patent [19]

Ostojic et al.

[11] 4,054,429
[45] Oct. 18, 1977

[54] METHOD AND APPARATUS FOR SOLVENT RECOVERY

[75] Inventors: Nedeljko Ostojic, Hamden; Vladimir G. Boscak, Hartford, both of Conn.

[73] Assignee: Geo. A. Hormel & Co., Austin, Minn.

[21] Appl. No.: 692,851

[22] Filed: June 4, 1976

[51] Int. Cl.² ............................................. B01D 53/14
[52] U.S. Cl. .......................................... 55/48; 55/74; 55/93; 55/228
[58] Field of Search .................. 55/37, 46, 47, 48, 59, 55/74, 93, 94, 228, 387, 88

[56] References Cited

U.S. PATENT DOCUMENTS

| | | | |
|---|---|---|---|
| 3,116,987 | 1/1964 | Honerkamp et al. | 55/48 X |
| 3,435,590 | 4/1969 | Smith | 55/48 X |
| 3,557,530 | 1/1971 | Voigt et al. | 55/47 X |
| 3,596,438 | 8/1971 | Beukonkamp et al. | 55/59 |
| 3,910,777 | 10/1975 | Jakob | 55/48 |

*Primary Examiner*—Wilbur L. Bascomb, Jr.
*Assistant Examiner*—Robert H. Spitzer

*Attorney, Agent, or Firm*—Williamson, Bains, Moore & Hansen

[57] ABSTRACT

A method and apparatus for recovering a contaminant solvent from a gas such as air or the like. Contaminated air or gas to be treated is initially directed through a first absorber containing an oil which absorbs the solvent to cleanse the gas. The air or gas may then be returned to the environment. The oil is transferred to a stripper, where inert gas passing therethrough absorbs the solvent to cleanse the oil. Condenser means adapted to receive inert gas outputted from the stripper facilitates recovery of the solvent. The inert gas is further cleansed in an auxiliary oil absorber and from thence passes to an activated charcoal filter which removes remaining traces of solvent from the inert gas through the process of adsorption. Cleansed inert gas is then recycled by returning it to the stripper for repetition of the process. Absorbent oil is also recycled by continuously pumping it between the stripper and the absorbers.

10 Claims, 1 Drawing Figure

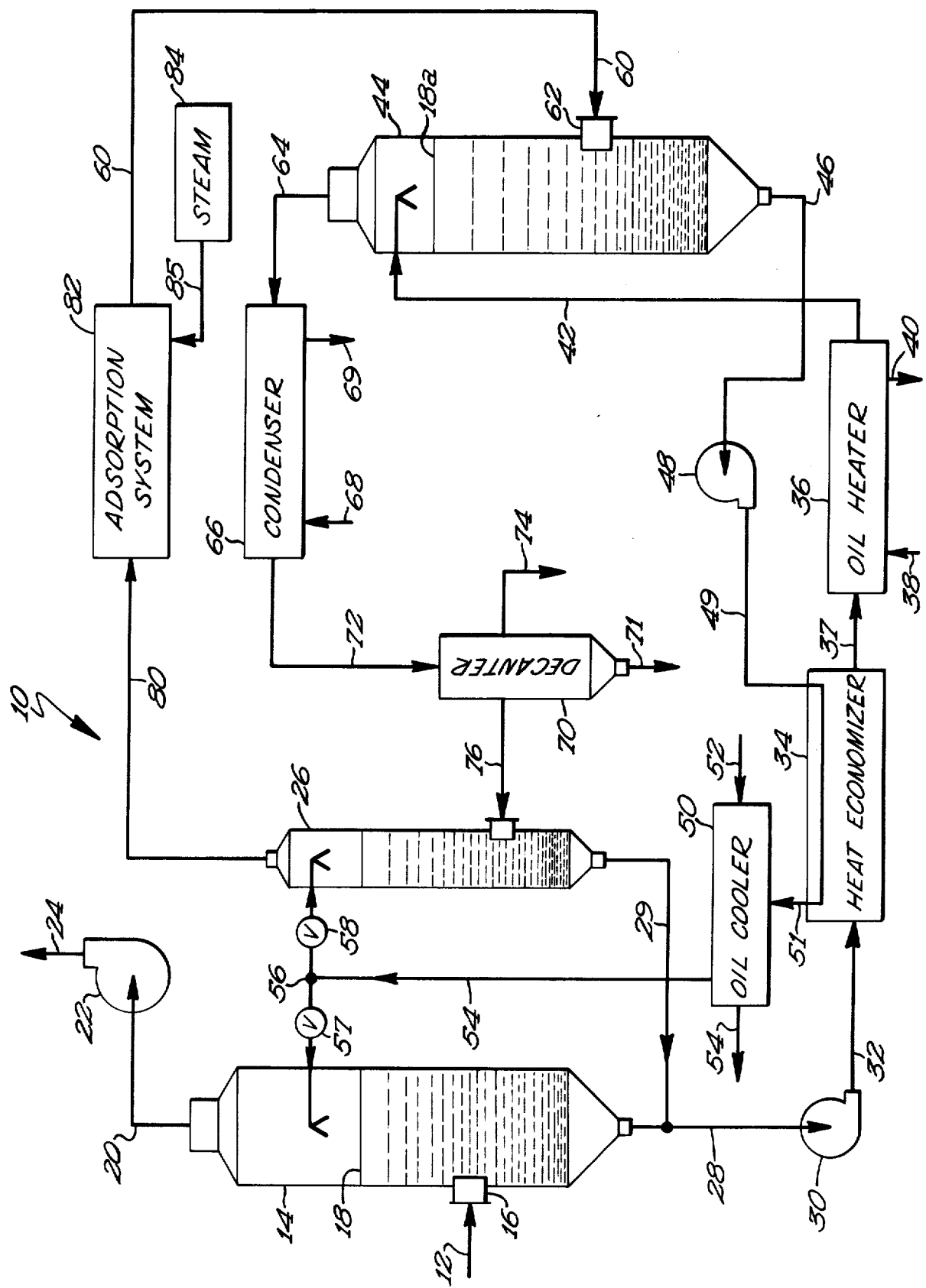

METHOD AND APPARATUS FOR SOLVENT RECOVERY

BACKGROUND OF THE INVENTION

This invention broadly relates to pollution control apparatus. More particularly, the present invention relates to a system for removing and recovering a contaminant solvent from a gas such as air or the like.

A variety of conventional industrial processes pollute air with organic solvent such as toluene or other organic hydrocarbons. Prior art systems have been developed which attempt to both purify the air and recover at least a portion of the contaminant solvent. At present most known solvent recovery processes depend mainly on the process of adsorption. For higher solvent concentrations absorption in oil can be used, but the solvent concentration should be generally above 1%. At lower solvent concentrations the adsorption capacity of a certain amount of activated charcoal is much larger than the absorption capacity of the same amount of oil.

In existing solvent recovery processes solvent may be stripped from either charcoal or oil by steam injected into the sorption medium. However, direct steam stripping can result in relatively large amounts of condensed steam which are unsuitable for recirculation. Solvents dissolved in water may therefore escape recovery, unless costly distillation processes are attempted. Furthermore, dissolved solvents create a serious water pollution problem. Since most solvents are chemically inert their removal or breakdown through conventional biological processes is exceedingly inefficient.

A problem with adsorption processes is the characteristic sensitivity to irreversible contamination. Contamination can be caused either by the presence of particulate material or specific gases in the airstream. Also, replacement of charcoal in an adsorption system is much more difficult than replacement of oil in an absorption system. When a gas to be treated contains silicone oil, for example, in addition to hydrocarbon solvents, adsorption purification systems will be deleteriously affected as the silicone oil adheres to the charcoal granules.

SUMMARY OF THE INVENTION

The instant invention comprises a method and apparatus for recovering a solvent from a contaminated gas. Both absorption and adsorption are employed, and while the difficulties often associated with either of these systems alone have been avoided, the benefits offered by these systems have been preserved.

Contaminated air or gas is first introduced into an absorption column filled with an absorbent liquid such as oil or the like. Purified air or gas may be vented from the absorber and returned to the environment, while the solvent-bearing liquid is then transferred to a stripper. An absorbent, inert gas introduced into the stripper mechanism removes the solvent from the liquid through absorption. The inert gas exiting from the stripper is then preferably delivered to a condenser where a portion of the solvent is recovered. Inert gas still bearing a portion of solvent contaminant is thereafter preferably delivered to an auxiliary absorber, where an absorbent liquid removes a further portion of the solvent from the inert gas. Gas outputted from the auxiliary absorber is then subjected to an adsorption medium, preferably comprising an activated charcoal system. The inert gas thus cleaned in the adsorber is recycled, being inputted to the stripper mechanism to facilitate the stripper operation. The inert gas thus is directed through a closed loop involving both absorption and adsorption processes. Importantly, in a preferred embodiment of this invention the absorbent liquid is recycled between the stripper mechanism and the first and second absorbers in a second closed loop.

Thus, it is an important object of this invention to combine the techniques of adsorption and absorption in a solvent recovery process.

Moreover, it is an object of this invention to facilitate the removal of pollutant contaminant solvents from air, while facilitating the efficient recovery of the solvents for reuse.

Another object of this invention is to minimize water pollution ordinarily occuring in conventional stripping technologies. It is a feature of this invention that very little if any solvent is mixed with steam or water during the adsorption process.

Another object of this invention is to provide a solvent recovery system of the character described which will conserve the active elements thereof. It is a feature of this invention that both the inert gas in the adsorption loop and the liquid in the absorption loop are both continuously recycled to minimize consumption thereof.

A still further object of this invention is to provide a solvent recovery process of the character described which will employ adsorption processes at an optimum stage of the process, thereby obtaining the advantages as associated therewith, without being affected by the disadvantages normally characteristic of adsorption processes.

A still further object of this invnetion is to provide a method and apparatus of the character described which is insensitive to irreversible contamination caused, for example, through the introduction of specific gases in the air stream.

Yet another object of this invention is to significantly reduce losses of solvent in a direct stripping technique. Since the adsorption section of this invention utilizes a direct stream stripping process only a relatively small amount of gas is processed thereby in comparison with the inlet air stream.

A still further object of this invention is to provide a method and apparatus for solvent recovery of the character described which exhibits extremely low sensitivity to contamination.

These and other objects and advantages of this invention, along with features of novelty apertinent thereto, will appear or become apparent in the course of the following description.

BRIEF DESCRIPTION OF THE DRAWING

The following drawing, which forms a part of the specification and is to be construed in conjunction therewith, is a schematic flow chart showing the operation of the instant invention and illustrating the flow paths of the various fluids associated therewith.

DETAILED DESCRIPTION OF THE DRAWING

Referring now to the drawing, a preferred form of a solvent recovery process and apparatus, generally designated by the reference number 10, is adapted to continuously purify incoming contaminated air or gas and to recover pollutant solvents removed therefrom. Recovered solvents may be recycled and the treated air, for example, may be returned to the environment. In order to accomplish these purposes the apparatus employs both absorption and adsorption processes.

Contaminated air or gas, containing, for example, a predetermined concentration of solvent, enters apparatus 10 through a line 12 where it is delivered to a main absorber 14 near the bottom thereof. By way of example, the solvent contaminant may comprise organic hydrocarbons such as benzene, toluene, naphtha or the like. A fitting 16 is provided for mechanical connection of line 12 to absorber 14. Absorber 14 is preferably filled with downwardly flowing absorption liquid, and as incoming air or gas rises through the absorber solvent carried by the air or gas will be absorbed by the liquid 18 therewithin. Solvent-free air or gas then exits from absorber 14 at the top thereof, through a line 20 and an optional pump 22. Air or gas cleansed in this manner may be returned to the environment free of contaminant solvents through a line 24.

Liquid 18 is preferably an absorption oil. The absorption process occurring in main absorber 14, and, as will later be described, in auxiliary absorber 26, is facilitated by the use of an oil having a low vapor pressure, preferably in the order of (1) micron of mercury. By way of example, an oil with which successful results have been achieved is commercially available from the Polar Company of Cleveland, Ohio, under the designation "Polar Oil No. 16."

Solvent-rich oil leaving main absorber 14 flows into line 28, which also receives solvent-rich oil ouputted from auxiliary absorber 26 via line 29. Pump 30 forces solvent-rich oil from each of the absorbers through pipe 32 into an optional heat economizer 34 and from thence into an oil heater 36 via a pipeline 37. Steam enters heater 36 via a line 38, and exits therefrom via line 40, in order to raise the temperature of oil therewithin to an appropriate stripping temperature of approximately 250° F.

Oil exiting from heater 36 is transmitted through a line 42 into the upper portion of a conventional stripper 44, and flows downwardly through the stripper 44 exiting from the bottom thereof through a line 46 which is in fluid flow communication with another pump 48. Pump 48 returns oil from stripper 44 through a line 49 and through heat economizer 34 into an oil cooler 50 through a line 51. Cooled water having a temperature of approximately 40° F. enters oil cooler 50 through a line 52 and exits therefrom through a line 54, thereby lowering the oil temperature to approximately 60° - 70° F. Oil outputted from cooler 50 is returned to absorbers 14 and 26 through a pipe 54 which delivers oil to a junction 56, and from thence through valves 57 and 58 to absorbers 14 and 26 respectively. Oil is thus processed in a closed loop, being continuously recycled between the absorbers 14 and 26 and stripper 44. It will be apparent to those skilled in the art that heat economizer 34 exchanges heat between incoming and outgoing oil, in order to preheat oil being delivered to oil heater 36, and to precool oil being returned to oil cooler 50.

As heated, solvent-rich oil is continuously entering and flowing downwardly through stripper 44, an inert gas (such as nitrogen or carbon dioxide) enters stripper 44 at the bottom thereof through a gas recycling line 60, attached to stripper 44 through a conventional fitting 62. Due to the higher partial pressure of solvent at the stripping temperature, solvent leaves the oil within stripper 44 and is absorbed and carried away by the upwardly moving inert gas. Gas exits from the top of stripper 44 through a line 64 which is connected to a condenser 66. Cooled water at a temperature of approximately 40° F. enters condenser 66 through a line 68 and exits therefrom through a line 69 to facilitate condensation.

It is important to note that the concentration of the solvent in the oil along line 29 leaving auxiliary absorption tower 26 is larger than the solvent concentration in the oil leaving the main absorption tower. Since the two streams are combined the net result is an increased concentration of the solvent in the oil leaving the absorbers and entering the stripper. This in turn increases the solvent concentration in the inert gas stream leaving the stripper, thereby increasing the efficiency of the solvent condensation.

Condenser 66 is in fluid flow communication with a decanter 70 via a pipe 72. Solvent recovered through the process of condensation is recoverable from decanter 70 through a line 74. Thus solvent which originally contaminated air or gas entering apparatus 10 through line 12 is now available for recycling or reuse.

Inert gas within decanter 70, however, still contains a relatively large concentration of solvent. The inert gas is therefore transmitted through a pipe 76 into auxiliary absorber 26 for further purification. It will be noted that auxiliary absorber 26 functions in largely the same manner as absorber 14 already described. Inert gas bubbling upward through the downwardly flowing oil within auxiliary absorber 26 is cleansed as solvent is absorbed by the oil. Inert gas outputted from absorber 26 is transmitted through a pipeline 80 into an adsorption system 82 which removes remaining solvent contamination in the inert gas. System 82 preferably comprises an activated charcoal filtering system, which removes contaminant solvent through the process of adsorption.

Solvent adsorbed on the charcoal is stripped using steam in a direct fashion. The solvent collected above the steam condensate is then recombined with the solvent recovered in the absorption part of the process.

Steam source 84 delivers steam to adsorption system 82 through a line 85. Inert gas heated and cleansed by the action of system 82 is then used as the source of inert gas for stripper 44, being delivered thereto via line 60. It will be apparent that some of the steam supplied by source 84 will eventually be condensed in condenser 66, and an output 71 at the bottom of decanter 70 is provided to drain off the resultant excess water.

It is important to note that the inert gas flow rate is not larger than 5 to 10% of the main air or gas stream incoming. Therefore the auxiliary absorber and the activated charcoal unit may be sized to process an equivalent of only 5 to 10% of the original air or gas stream.

Thus apparatus 10 employs two closed, recycling loops in order to take advantage of both adsorption and absorption purification processes. Oil is continuously recycled between the absorbers, which remove solvent through the process of absorption, and the stripper 44. Recycled inert gas, which is employed to cleanse oil within stripper 44, is itself cleansed by the process of absorption in absorber 26, and by the process of adsorption within system 82.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations.

This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A method of recovering a solvent from a gas contaminated therewith, said method comprising the steps of passing contaminated gas into a main absorber containing an absorbing liquid, said absorbent liquid being circulated in a predetermined closed cycle of flow through the main absorber, then through a stripper, thereafter through an auxiliary absorber and then being returned to said main absorber, the solvent being removed from the gas as solvent is absorbed by the absorbing liquid in the main absorber;

circulating an inert gas in a predetermined closed cycle of flow, first through the stripper, whereby the solvent is absorbed by the inert gas and is stripped from the absorbing liquid, the inert gas containing the solvent then being circulated, in its closed cycle of flow, through a condenser whereby the solvent is condensed, thereafter circulating the inert gas and condensed solvent through a decanter to thereby collect and remove the condensed solvent therefrom;

then circulating the inert gas through the auxiliary absorber containing absorbing liquid to remove any solvent from the gas, and thereafter returning said inert gas to the stripper.

2. The method as defined in claim 1 wherein the inert gas, in its closed cycle of flow, is passed through an adsorption medium to remove any solvent from the gas after the inert gas is passed through the auxiliary absorber and prior to returning the inert gas to the stripper.

3. The method as defined in claim 1 including the additional steps of heating said absorbent liquid prior to said passage of the absorbent liquid to the stripper, and cooling said absorbent liquid prior to returning same to said absorber.

4. The method as defined in claim 3 including the additional step of directing absorbent liquid through a heat economizer prior to said liquid heating and stripping steps and directing absorbent liquid through said same heat economizer during said returning step prior to said cooling step to thereby maximize thermal efficiency.

5. Apparatus for recovering a solvent from a gas contaminated therewith, said apparatus comprising:

first absorber means containing absorbent liquid and adapted to receive said contaminated gas for removing solvent from said gas as solvent is absorbed by said absorbent liquid there within;

stripping means for removing solvent from said absorbent liquid by passing an inert gas therethrough, the inert gas thereby absorbing solvent to be recovered;

condenser means adapted to receive inert gas outputted from said stripping means for condensing at least a portion of said solvent and thereby recovering same;

second absorber means containing absorbent liquid and adapted to receive inert gas outputted by said condenser means for further removing solvent from said inert gas, said solvent being absorbed by said absorbent liquid within said second absorber; first conduit means interconnecting said first absorber, said stripping, and said second absorber means in communicating relation whereby absorbed liquid is circulated through the first absorber, said stripping and said second absorber means, and returned to said first absorber means from said stripping means in a closed pattern of flow, second conduit means interconnecting said stripping, second absorber and condenser means in communicating relation whereby the inert gas is circulated through said stripping, condenser, and second absorber means and returned to said stripping means in a closed pattern of flow.

6. The apparatus is defined in claim 5 including means for heating inert gas prior to delivery to said stripper means.

7. The apparatus as defined in claim 5 and an adsorption means, connected in communicating relation with said second conduit means for removing solvent from said inert gas prior to delivery to said stripping means to thereby minimize solvent concentration within inert gas utilized by said stripper means.

8. The apparatus as defined claim 7 including means connected in communicating relation with said first conduit means for heating absorbent liquid prior to said stripping step and means for cooling absorbent liquid prior to returning said absorbent liquid to said absorber.

9. The apparatus is defined in claim 7 including heat economizer means connected in communicating relation with said first conduit means for exchanging heat between absorbent liquid in a first flow path towards said stripper means and a second flow path towards said absorber means thereby maximizing the thermal efficiency of said apparatus.

10. The apparatus as defined in claim 5 and a decanter means interconnected in communicating relation with said second conduit means adapted to receive inert gas and condensed solvent from the condenser to permit the condensed solvent to be collected and removed therefrom.

* * * * *